United States Patent
Di Nicolantonio et al.

(10) Patent No.: US 11,204,061 B2
(45) Date of Patent: Dec. 21, 2021

(54) BEARING UNIT FOR AN ACCESSORY TOOL

(71) Applicant: Robert Bosch GmbH, Stuttgart (DE)

(72) Inventors: Aldo Di Nicolantonio, Solothurn (CH); Pascal Schnell, Bärschwil (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/814,404

(22) Filed: Mar. 10, 2020

(65) Prior Publication Data
US 2020/0300292 A1   Sep. 24, 2020

(30) Foreign Application Priority Data

Mar. 18, 2019 (DE) .................. 10 2019 203 620.1

(51) Int. Cl.
*F16C 17/02*   (2006.01)
*B27B 5/32*   (2006.01)

(52) U.S. Cl.
CPC .............. *F16C 17/022* (2013.01); *B27B 5/32* (2013.01); *F16C 2322/34* (2013.01)

(58) Field of Classification Search
CPC ........ F16C 17/02; F16C 17/022; F16C 17/10; F16C 2322/34; B27B 5/14; B27B 5/30; B27B 5/32; B23D 47/123
See application file for complete search history.

(56) References Cited

U.S. PATENT DOCUMENTS

| | | | | |
|---|---|---|---|---|
| 2,062,969 | A | | 12/1936 | Dutcher |
| 2,726,493 | A | | 12/1955 | Young et al. |
| 4,934,238 | A | * | 6/1990 | Lauffer ............... B27B 5/32 83/666 |
| 7,905,024 | B2 | * | 3/2011 | Juhojuntti ........... B23D 47/123 30/388 |
| 2006/0037447 | A1 | * | 2/2006 | Groven .............. B27B 5/34 83/13 |
| 2008/0003929 | A1 | * | 1/2008 | Degen ............... B24B 23/02 451/359 |
| 2009/0156107 | A1 | * | 6/2009 | Guenther ........... B24B 23/028 451/359 |

FOREIGN PATENT DOCUMENTS

| | | | | |
|---|---|---|---|---|
| DE | 37 40 200 | A1 | | 6/1989 |
| DE | 4305317 | A1 | * | 9/1994 ........ B24B 45/006 |
| DE | 196 16 764 | A1 | | 11/1997 |
| DE | 10 2010 042 016 | A1 | | 4/2012 |
| FR | 1538171 | A | * | 8/1968 ............ B27B 5/32 |
| WO | WO-9500288 | A1 | * | 1/1995 ........ B24B 45/006 |

* cited by examiner

*Primary Examiner* — Phillip A Johnson
(74) *Attorney, Agent, or Firm* — Maginot, Moore & Beck LLP

(57) ABSTRACT

A bearing adapter for a disk-shaped accessory tool which has two sides. The bearing adapter includes a bearing unit configured to reduce a bearing recess of the accessory tool. The bearing unit is configured to adjoin the accessory tool and to enclose a portion of the accessory tool on the two sides when the bearing unit is mounted on the accessory tool.

18 Claims, 3 Drawing Sheets

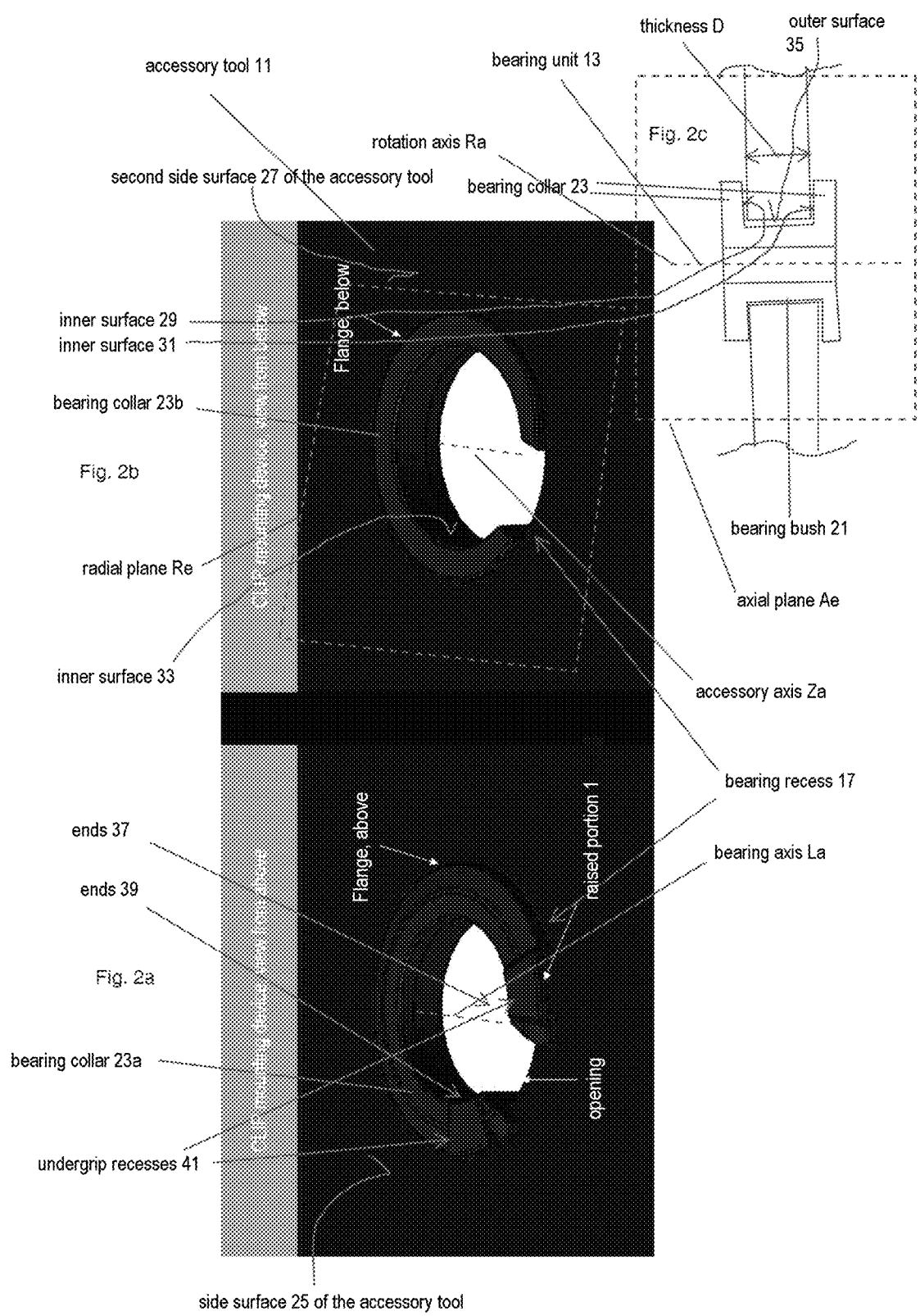

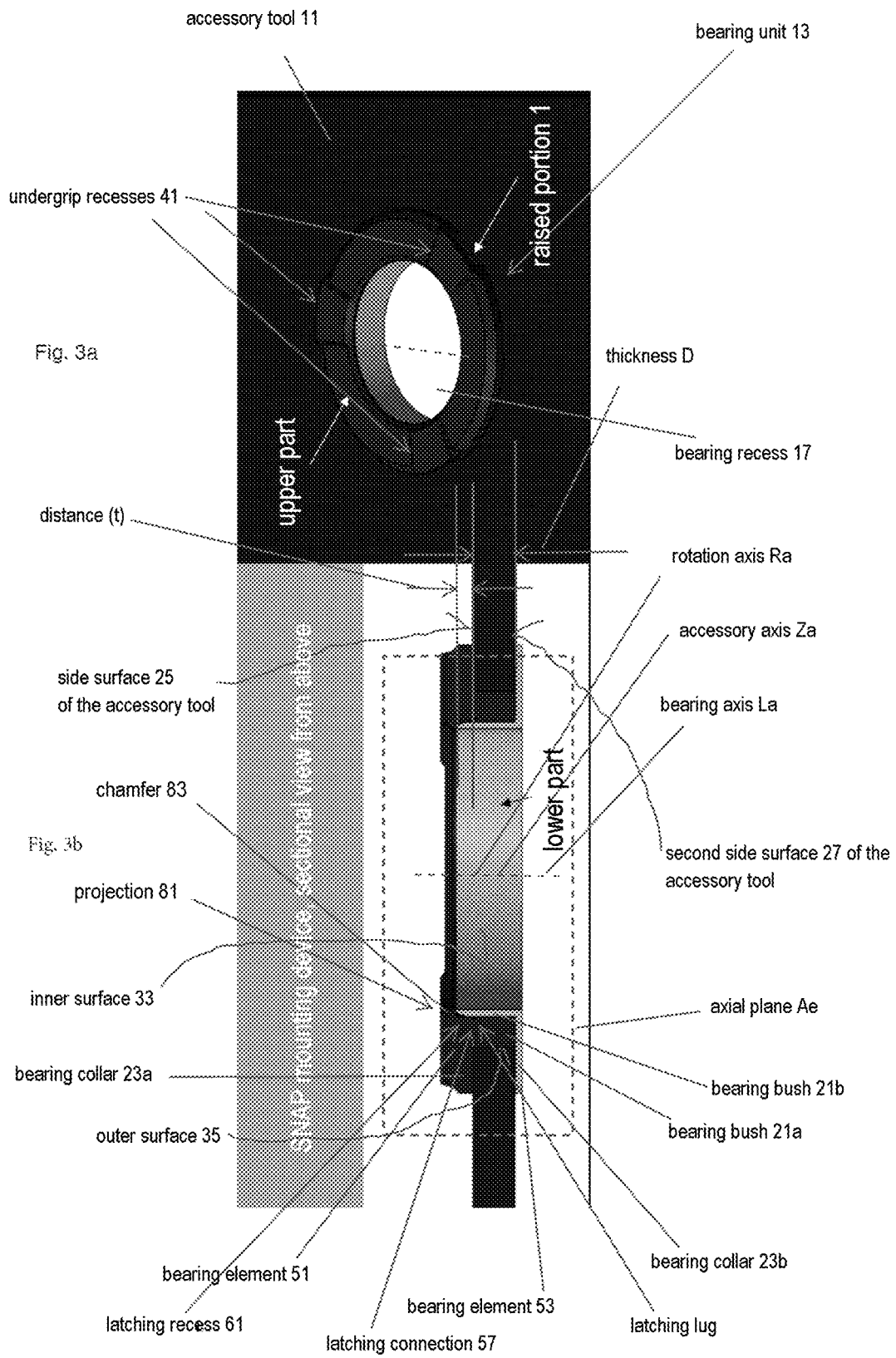

BEARING UNIT FOR AN ACCESSORY TOOL

This application claims priority under 35 U.S.C. § 119 to patent application no. 10 2019 203 620.1 filed on Mar. 18, 2019 in Germany, the disclosure of which is incorporated herein by reference in its entirety.

The present disclosure relates to a bearing unit.

BACKGROUND

U.S. Pat. No. 2,726,493 discloses a reducing ring for a grinding wheel, which is designed to be connected to the grinding wheel in order to operate the grinding wheel with machines of differing outer diameters.

SUMMARY

The disclosure is based on the object of improving a bearing unit for an accessory tool by simple structural design measures.

The object is achieved with a bearing unit for an accessory tool, in particular a disk-shaped accessory tool, for reducing a bearing recess of the accessory tool.

According to the disclosure, the bearing unit is designed to adjoin the accessory tool and to enclose the accessory tool on both sides.

In the case of accessory tools that have a bearing recess for fastening and/or mounting on a machine, the hole diameter is matched to a diameter of an output unit, in particular an output shaft, of the power tool. For the use of an accessory tool on a power tool, an accessory tool is produced, for example, with identical properties and with differing hole diameters for a corresponding output shaft of the power tool. In the case of a very large number of power tools and differing output shafts, production of accessory tools for the respective output shafts of the power tools would be uneconomic and resource-intensive.

In order to reduce the multiplicity of almost identical products having a different bearing recess, it is provided according to the disclosure to use a bearing unit that is designed to adapt, or reduce, the bearing recess of the respective accessory tools to the output unit. In order to protect the environment, it is possible in principle to proceed to the provision of an accessory tool having a maximally large bearing recess that are adapted to an output unit of the power tool by means of the bearing unit.

By means of the bearing unit, accessory tools can be adapted to the power tool in a particularly reliable manner, thereby in particular reducing production costs and required retail spaces, on the one hand, and on the other hand improving ease of use.

In particular, the bearing unit is designed to be reusable. Preferably, the bearing unit is realized as a bearing adapter.

Preferably, the bearing unit is designed to reduce a radial extent, in particular a diameter, of the bearing recess.

By means of the bearing unit according to the disclosure, unintentional demounting of the bearing unit during changing of the accessory tool can be prevented in that the bearing unit is connected to the accessory tool in such a manner that the bearing unit remains on the accessory tool and/or can be separated from the accessory tool by means of a tool such as, for example, a screwdriver.

In particular, the bearing unit according to the disclosure cannot be demounted from the accessory tool without the aid of tools. Preferably, the bearing unit is arranged on and/or connected to the accessory tool in such a manner that the bearing unit is secured against being demounted by a force applied by one or more fingers of an average operator. This prevents the bearing unit from being unintentionally demounted from the accessory tool when the accessory tool is demounted from a power tool.

Preferably, the risk of unintentional demountability is greater if the bearing unit is held on the accessory tool in such a manner that it can be demounted without the aid of tools. Also in the case of mounting of the accessory tool, involving passing of the output shaft through the hole, unintentional ejection of the bearing unit can be prevented, or at least rendered more difficult, by means of the disclosure.

An unnoticed loss of the accessory tool can lead to unsafe mounting of the accessory tool on the power tool, and thus to a considerable safety risk.

In particular, the bearing unit may be designed to enclose an extent, in particular an axial extent, of the accessory tool on both sides of the bearing recess. Preferably, the bearing unit may be designed to delimit the bearing recess of the accessory tool. Preferably, the bearing unit may be designed to delimit an extent, in particular an axial extent, of the accessory tool. Further, preferably, the bearing unit may be designed to limit an extent, in particular a radial extent, of the accessory tool. The bearing unit may also preferably be designed to delimit the bearing recess. Preferably, the bearing unit may be designed to lie directly against the accessory tool.

A connected state is to be understood to mean, in particular, a state in which the bearing unit is connected to the accessory tool.

For reasons of clarity, the bearing unit and the accessory tool may each have an axis that, in a connected state in which the bearing unit is connected to the accessory tool, coincide, in particular are parallel, preferably concentric. The axes each constitute geometrical axes that constitute, for example, an auxiliary axis for at least partially forming or projecting a geometrical body.

The accessory tool may be realized as a grinding disk, grinding stone, cutting blade, grinding sheet or any other product considered appropriate by persons skilled in the art.

The bearing unit may be realized, at least portionally, as a bearing bush. The bearing unit may be realized, at least portionally, as at least one bearing flange.

On both sides is to be understood to mean two sides of the accessory tool that face away from each other and that, in particular, at least portionally, define a thickness of the accessory tool.

It may be expedient for the bearing unit to have a radial extent that is greater than a radial extent of the bearing recess of the accessory tool. Particularly preferably, the bearing unit may be designed to overlap an accessory tool, in particular to overlap on both sides. In particular, the bearing unit may be C-shaped in a cross-section of an axial plane. This makes it possible, in particular, to realize particularly reliable protection of the accessory tool in the region of the bearing recess, such that the contours and surfaces that delimit the bearing recess of the accessory tool are protected in a particularly reliable manner.

It may also be expedient for the bearing unit to have an axial extent that is greater than an axial extent of the bearing recess of the accessory tool. In particular, the bearing unit may be arranged on the accessory tool in such a manner that the bearing unit protrudes from the accessory tool on both sides. It is thereby possible to realize an inner surface for supporting the accessory tool, in particular on a drive unit, that enables an optimized power transmission, in order preferably to operate the accessory tool with reduced vibration.

Furthermore, it may be expedient for the bearing unit to have a first collar-shaped portion and a second collar-shaped portion. The collar-shaped portions may extend in the radial direction. The collar-shaped portions may overlap the accessory tool. The collar-shaped portions may be arranged on mutually opposite sides of the accessory tool. The collar-shaped portions may delimit an extent of the bearing unit in the axial direction. The first and/or second collar-shaped portion may be designed to bear directly against a first and/or second side surface of the accessory tool. The collar-shaped portions extend in the radial direction. The collar-shaped portions may be designed to bear with full surface contact against the accessory tool. The collar-shaped portion may be realized as a bearing collar. The two collar-shaped portions may be connected to each other by means of a cylindrical portion in at least one operating state, in particular in which the bearing unit is being operated on the accessory tool. This allows the bearing unit to be connected to the accessory tool in a particularly reliable manner.

Furthermore, it may also be expedient for the bearing unit to have a first and/or second cylindrical portion. The first and/or second cylindrical portion may be designed to delimit the bearing recess. The first and/or second cylindrical portion may have an inner side, in particular having an inner surface, that is designed to delimit the bearing recess. The first and/or the second cylindrical portion may have an outer side, in particular having an outer surface, that is designed to bear against, or be supported on, the accessory tool. The cylindrical portion may be realized as a bearing bush. This allows the bearing unit to be held on the bearing unit in a particularly reliable manner.

It is proposed that, in a connected state, the cylindrical portion protrudes by a distance (t) on a side of the accessory tool that faces away from the collar-shaped portion. The distance may be more than 1 mm, preferably more than 2 mm, more preferably more than 3 mm. This allows the bearing unit to be used on accessory tools of differing thicknesses. Resources can thus be saved.

It is also proposed that the first and/or second cylindrical portion is integral with the first and/or second collar-shaped portion. It can thereby be ensured that the bearing unit is not demounted unintentionally.

It is further proposed that the bearing unit is realized as a single part. In particular, the two collar-shaped portions may be realized as a single piece. Preferably, the bearing unit may be made from a plastic. This makes the bearing unit particularly flexible and reusable.

It may be expedient for the bearing unit to have a first bearing element and a second bearing element that are connected to each other, in particular by force-fit, form-fit and/or material closure. The first bearing element may be formed from a first collar-shaped portion and a first cylindrical portion. The second bearing element may be formed from a second collar-shaped portion and a second cylindrical portion. In particular, the first bearing element may be made from a plastic. Preferably, the second bearing element may be made from a metal. The bearing unit, in particular the first and/or the second bearing element, may be realized in the shape of a circular segment or a circular ring. The bearing unit can thus be connected to the power tool in a particularly reliable and tolerance-optimized manner.

It may also be expedient for the bearing unit, in particular the first bearing element and/or the second bearing element, to be arranged in the bearing recess of the accessory tool in such a manner that a clearance fit is achieved. It can thereby be ensured, for example, that the second bearing element is not held in the bearing recess when the first bearing element is demounted.

Furthermore, it may be expedient that the second bearing element can be connected to, in particular can be inserted in, the first bearing element in such a manner that the second bearing element expands the first bearing element in such a manner that the first bearing element can be connected to the accessory tool in a force-fitting manner. As a result, for example, the first bearing element can preload the second bearing element in such a manner that the bearing unit can be held on the accessory.

Furthermore, it may be expedient for the bearing unit, in particular the first bearing element, to have a projection that projects radially inwards. The projection may be arranged in the radial direction on a side of the bearing unit, in particular of the first bearing element, that faces away from the bearing collar. The projection may be designed to delimit a minimum radial extent of the bearing unit. The projection may be designed to center the bearing unit and/or the accessory tool during while they are being received on the power tool. The projection may have a chamfer, in particular a centering chamfer. The projection may delimit the latching recess, in particular in the axial direction. The projection may be designed as a stop for the second bearing element, in particular the second bearing bush. The projection may define a receiving position of the second bearing element. The projection may be realized in such a manner that the projection prevents accidental release, or demounting, of the bearing unit, in particular of the second bearing element, relative to the first bearing element, as the bearing unit and/or the accessory tool are/is being received on a power tool. Being received is to be understood to mean an operation in which the bearing unit and/or the accessory tool are/is received on a power tool. The projection may extend in the radial direction in such a manner that the projection surrounds the second bearing element, in particular the bearing sleeve of the second bearing element, at least portionally. Thus, when the bearing unit is being received, and accordingly fitted on a hand-held power tool, for example the output shaft of the hand-held power tool can be prevented from impinging on the second bearing element and pulling it away from the accessory tool.

Furthermore, it may be expedient for the bearing unit to be realized in the shape of a circular ring. In particular, the bearing unit may be C-shaped in a radial plane. This renders possible a particularly reliable distribution of forces.

It is proposed that the bearing unit is realized in the shape of a circular segment. The bearing unit, in particular the bearing element, extends in an axial plane around a large part of the circumference. The bearing unit, in particular at least one bearing element, extends in an axial plane around the axis of the bearing unit by more than 240°, in particular by more than 270°, preferably by more than 300°, more preferably by more than 315°, particularly preferably by more than 330°. The bearing unit, in particular at least one bearing element, extends in an axial plane around the axis of the bearing unit by less than 355°, in particular by less than 330°, preferably by less than 300°, more preferably by less than 270°. This allows the bearing unit to be removed in a particularly advantageous and non-destructive manner.

It is also proposed that the bearing unit, in particular the bearing element, has an undergrip recess. The undergrip recess is designed for releasing, or separating, the bearing unit, in particular the bearing element, from the accessory tool. For the purpose of releasing, or separating, the bearing unit from the accessory tool, a tool such as, for example, a screwdriver may be used to engage in the undergrip recess, for example to lever the bearing unit out of the bearing recess. The bearing unit can be demounted in a particularly advantageous manner, for example by means of its tool.

The undergrip recesses may be realized as protuberances that form a cavity between the bearing unit and the accessory tool. The cavity may be delimited by the bearing unit and the accessory tool.

The disclosure also relates to a system comprising an accessory tool and a bearing unit received on the accessory tool.

BRIEF DESCRIPTION OF THE DRAWINGS

Further advantages are given by the following description of the drawings. The drawings illustrate exemplary embodiments of the disclosure. The drawings, the description and the claims contain numerous features in combination. Persons skilled in the art will also expediently consider the features individually and combine them to form appropriate further combinations.

In the following figures, components that are the same are denoted by the same references. There are shown:

FIG. 2a depicts a top perspective view of the bearing unit according to the disclosure, FIG. 2b depicts a bottom perspective view of the bearing unit according to the disclosure, FIG. 2c depicts a sectional view of the bearing unit, FIG. 3a depicts a perspective view of a development of the bearing unit according to the disclosure from above, and FIG. 3b depicts a sectional view of the bearing unit.

DETAILED DESCRIPTION

Figure 1:
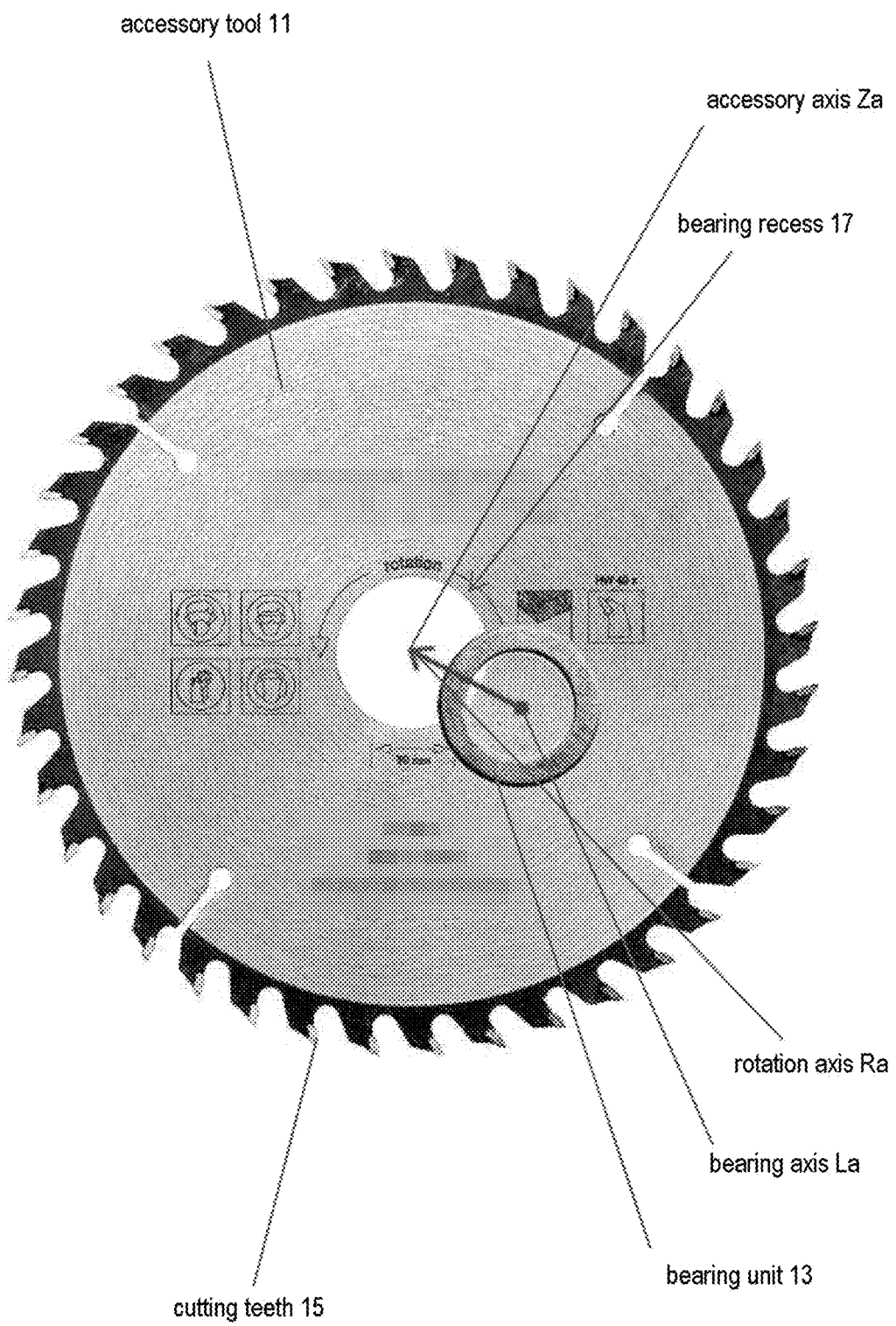
FIG. 1 depicts a side plan view of an exemplary accessory tool, with an exemplary bearing unit.

The figures relate to an accessory tool 11, realized as a cutting disk, for cutting workpieces. The cutting disk can be used universally and in particular is suitable for performing work on workpieces composed of cellulose such as, for example, grass, scrub or roots, wood, plastic or a composite. Alternatively, however, the cutting disk may also be used for performing work on, for example, metal, stone or a composite. However, the disclosure is not limited to a cutting disk, but instead may also be used for other accessory tools 11 considered appropriate by persons skilled in the art, such as, for example, grinding disks, grinding stones and/or diamond disks.

The accessory tool 11 is designed to be detachably received on standard rotationally driven power tools (not shown). The accessory tool 11 may be received in a receiving device already known to persons skilled in the art and designed to receive the accessory tool 11, in particular in an output unit of a power tool, in particular a hand-held power tool, having a rotatory and/or translational working motion onto a workpiece on which work is to be performed. In this case, for example, a translational advance can be imparted to the tool, in that the operator of the power tool applies a force to the power tool, in particular to a power tool housing.

A suitable power tool in this case is both a stationary power tool such as, for example, a circular table saw according to the applications DE 102010042016 or U.S. Pat. No. 2,062,969 A, and a non-stationary power tool such as, for example, a circular hand saw according to the application DE 3740200 A1, or such as, for example, a backpack brushcutter according to the application DE 19616764 A1. Alternatively, a hand-held circular saw or angle grinder is also suitable.

FIG. 1 shows a disk-shaped accessory tool 11 with a bearing unit 13. The accessory tool 11 is realized as a saw blade, and has a multiplicity of cutting teeth 15 on a circumference. The cutting teeth 15 are designed to form a cutting edge, by means of which a workpiece can be machined, as they rotate about a rotation axis Ra of the accessory tool 11. Alternatively or additionally, the accessory tool 11 may be realized as a grinding disk, grinding stone, cutting blade, grinding sheet or any other product considered appropriate by persons skilled in the art.

The accessory tool 11 has a bearing recess 17 for fastening and/or mounting on a power tool. The bearing recess 17 is realized as a hole diameter, and is matched to a diameter of an output shaft of an output unit of a power tool. The bearing recess 17 is circular.

For the purpose of using the accessory tool 11 on an output shaft that, for example, has a diameter smaller than the hole diameter of the bearing recess 17, the bearing recess 17 can be reduced by means of the bearing unit 13. The bearing unit 13 is designed to be inserted into the bearing recess 17 in order to reduce the latter, at least partially, in diameter. The bearing unit 13 can thus be of a reusable design. The bearing unit 13 is realized as a bearing adapter. The bearing unit 13 is designed to adjoin the accessory tool 11 and to enclose the accessory tool 11 on both sides (FIG. 2).

The bearing unit 13 is arranged on the accessory tool 11 and/or connected to it in such a manner that the bearing unit 13 is secured against being demounted by a force applied by one or more fingers of an average operator.

The bearing unit 13 is designed to enclose an axial extent of the accessory tool 11 on both sides of the bearing recess 17. The bearing unit 13 is designed to delimit the bearing recess 17 of the accessory tool 11. The bearing unit 13 is designed to delimit an axial extent of the accessory tool 11. The bearing unit 13 is designed to delimit a radial extent of the accessory tool 11. The bearing unit 13 is designed to lie directly against the accessory tool 11.

The bearing unit 13 and the bearing recess 17 of the accessory tool 11 may be arranged coaxially in relation to each other. The bearing unit 13 is arranged, at least portionally, in the bearing recess 17. The bearing recess 17 may extend around the bearing unit 13, at least portionally, in an axial plane Ae, relative to an accessory axis Za of the accessory tool 11, that is realized as a rotation axis Ra. The bearing unit 13 may have a bearing axis La, and the accessory tool 11 may have an accessory axis Za, which coincide in a connected state in which the bearing unit 13 is connected to the accessory tool 11.

The bearing unit 13 has, at least portionally, a bearing bush 21 and, at least portionally, a first bearing collar 23a, 23ba and a second bearing collar 23a, 23bb. The bearing collars 23a, 23b extend around the bearing bush 21. The bearing collars 23a, 23b extend in the radial direction. In a sectional view, the bearing unit 13 is C-shaped in a radial plane (FIG. 2c, 3b). The bearing collars 23a, 23b delimit a radial extent of the bearing unit 13. The bearing collars 23a, 23b delimit the bearing bush 21. The bearing collars 23a, 23b are arranged on sides of the bearing bush 21 that face away from each other. The bearing collars 23a, 23b project from the accessory tool 11 in the radial direction of the accessory axis Za. The first bearing collar 23a, 23b lies against a first side surface 25 of the accessory tool 11. The second bearing collar 23a, 23b lies against a second side surface 27 of the accessory tool 11, which faces away from the first side surface 25. The first side surface 25 and the second side surface 27 of the accessory tool 11 form the depth, or the thickness D, of the accessory tool 11, at least in a region around the bearing recess 17.

The bearing collars 23a, 23b each have a radial extent that is greater than a radial extent of the bearing recess 17 of the accessory tool 11. The bearing collars 23a, 23b are designed to overlap an accessory tool 11 on both sides. The bearing unit 13 is C-shaped in a section along an axial plane Ae.

The bearing unit 13, in particular the bearing collars 23a, 23b, has/have an axial extent that is greater than an axial extent of the bearing recess 17 of the accessory tool 11. The bearing collars 23a, 23b are arranged on the accessory tool 11 in such a manner that the bearing unit 13 project from the accessory tool 11 on both sides. The bearing collars 23a, 23b each have inner surfaces 29, 31 that lie against the side surfaces 25, 27 of the accessory tool 11. The bearing collars 23a, 23b are designed to bear with full surface contact against the accessory tool 11.

The two bearing collars 23a, 23b are connected to each other by means of the bearing bush 21 in at least one operating state, in particular in which the bearing unit 13 is operated on the accessory tool 11. The bearing bush 21 is designed to connect the bearing collars 23a, 23b to each other.

The bearing bush 21 and the two bearing collars 23a, 23b are realized as a single piece (FIG. 2). The bearing bush 21 is realized by a cylindrical portion of the bearing unit 13 that delimits the bearing recess 17. The cylindrical portion has an inner side, having an inner surface 33 that is designed to delimit the bearing recess 17. The cylindrical portion has an outer side, having an outer surface 35 that is designed to bear against, or be supported on, the accessory tool 11. The bearing unit 13 in this case is made from a plastic.

The bearing unit 13 is realized as a single part. The bearing unit 13 is realized in the shape of a circular segment. The bearing unit 13 extends in an axial plane Ae around the axis of the bearing unit 13 by more than 300° and by less than 355°, such as, for example, 350°. The bearing unit 13 extends as a C-shape in a radial plane Re. The bearing unit 13 in this case has a first end 37, and a second end 39 that is opposite the first end 37. The two ends 37, 39 delimit an extent of the bearing unit 13. The two ends 37, 39 are spaced apart from each other in such a manner that, for example, one of the ends 37, 39 can be swiveled out in the direction of the bearing axis La in such a manner that the end 37 does not touch the opposite end 39. Pulling on one of the ends 37, 39 thus enables the bearing unit 13 to be pulled particularly easily out of the bearing recess 17.

The bearing unit 13 also has two undergrip recesses 41. The undergrip recesses 41 are arranged at the ends 37, 39 of the bearing unit 13. The undergrip recesses 41 are designed for releasing, or separating, the bearing unit 13 from the accessory tool 11 by means of a tool such as, for example, a screwdriver, in that the screwdriver engages in the undergrip recess 41 to lever the bearing unit 13 out of the bearing recess 17.

The undergrip recesses 41 are realized as protuberances that form a cavity 43 between the bearing unit 13, or the bearing collar 23a, 23b, and the accessory tool 11. The cavity 43 is delimited by the bearing collars 23a, 23b, the bearing bush 21 and the accessory tool 11. The undergrip recesses 41 are formed by a partial elevation of the bearing collar 23.

The bearing unit 13 may be realized as two parts. The bearing unit 13 is realized in the shape of a circular ring. The bearing unit 13 may have two bearing elements 51, 53 that each have a bearing collar 23a, 23b and a bearing bush 21a, 21b (FIG. 3). A first bearing element 51 has a first bearing bush 21a and a first bearing collar 23a that are realized as a single piece. A second bearing element 53 has a second bearing bush 21b and a second bearing collar 23b that are realized as a single piece. The first bearing element 51 is made from a plastic. The second bearing element 53 is made from a metal.

The bearing bushes 21a, 21b and the bearing collars 23a, 23b are at least substantially similar in design to the bearing bush 21 and the bearing collars 23a, 23b of the bearing unit 13 realized as a single piece (FIGS. 2a to 2c). The bearing unit 13 has a first and a second bearing bush 21a, 21b. The first and the second bearing bush 21a, 21b are designed to delimit the bearing recess 17. Similar to FIG. 2, the first bearing bush 21a has an outer side, having an outer surface that is designed to delimit the bearing recess 17. Similar to FIG. 2, the second bearing bush 21b has an inner side, having an inner surface that is designed to bear against, or be supported on, the accessory tool 11.

The bearing elements 51, 53, in particular the bearing bushes 21a, 21b of the bearing elements 51, 53, act in combination with each other when in a connected state, and form the bearing unit 13.

The first bearing bush 21a and the second bearing bush 21b are connected to each other in a force-fitting and/or form-fitting manner. In the case of a form-fit connection, the second bearing bush 21b of the second bearing element 53 can be connected to the first bearing bush 21a of the first bearing element 51. The form-fit connection may be effected by means of a latching connection 57. The second bearing bush 21b has a latching lug 59 on a side of the second bearing element 53 that faces away from the second bearing collar 23b. The first bearing bush 21a has a latching recess 61 on a side that faces towards the first bearing collar 23a. The latching lug 59 is realized as a raised latching portion extending in the radial direction of the bearing axis La. The latching recess 61 is realized as a latching depression extending in the radial direction of the bearing axis La. The latching lug 59 is designed to engage in the latching recess 61 and secure the bearing elements 51, 53 against axial displacement.

In the case of a force-fit connection, the first bearing element 51 is arranged in the bearing recess 17 of the accessory tool 11 in such a manner that a clearance fit is achieved, such that it can be ensured that, for example, the first bearing element 51 is not held in the bearing recess 17 when the second bearing element 53 is demounted. The second bearing element 53 in this case can be connected to, in particular inserted in, the first bearing element 51 in such a manner that the second bearing element 53 expands the first bearing element 51 in such a manner that the first bearing element 51, with the accessory tool 11, is held in a force-fitting manner in the bearing recess 17. As a result, for example, the second bearing element 53 can preload the first bearing element 51 in such a manner that the bearing unit 13 is held on the accessory tool 11.

The second bearing bush 21b, in a connected state, protrudes by a distance t on a side of the accessory tool 11 that faces away from the bearing collar 23a, 23b. The distance may be more than 1 mm, preferably more than 2 mm, more preferably more than 3 mm. The bearing unit 13 can thus be used on accessory tools 11 of differing thicknesses.

The first bearing element 51 has three undergrip recesses 41. The undergrip recesses 41 are realized in a manner similar to the undergrip recesses 41 from FIG. 2.

The first bearing element 51 has a projection 81 that projects radially inwards. The projection 81 is arranged in the radial direction on a side of the first bearing element 51 that faces away from the bearing collar 23a. The projection 81 is designed to delimit a minimum radial extent of the bearing unit 13. The projection 81 is designed to center the bearing unit 13 and/or the accessory tool 11 while they are being received on the power tool. The projection 81 has a chamfer 83 realized as a centering chamfer. The projection 81 delimits the latching recess in the axial direction. The projection 81 may be designed as a stop for the second bearing bush 21b of the second bearing element 53. The projection 81 defines a receiving position of the second bearing element 53. The projection 81 is realized in such a manner that the projection 81 prevents accidental release of the second bearing element 53, relative to the first bearing element 51, as the bearing unit 13 and/or the accessory tool 11 are/is being received on a power tool. The projection 81 may extend in the radial direction in such a manner that the projection 81 surrounds the bearing sleeve 21b of the second bearing element 53, at least portionally. Thus, when the bearing unit 13 is being received, and accordingly fitted onto a power tool, for example the output shaft of the power tool can be prevented from impinging on the second bearing element 53 and pulling it away from the accessory tool 11.

What is claimed is:

1. A bearing adapter for a disk-shaped accessory tool having two sides and a bearing recess matched to a diameter of an output unit of a first power tool, comprising;
   a bearing unit configured to reduce the bearing recess of the accessory tool to a delimited bearing recess matched to a diameter of an output unit of a second power tool, the bearing unit configured to adjoin the accessory tool and to enclose a portion of the accessory tool on the two sides when the bearing unit is mounted on the accessory tool, wherein the bearing element includes an undergrip recess.

2. The bearing adapter of claim 1, wherein the bearing unit has a radial extent that is greater than a radial extent of the bearing recess of the accessory tool.

3. The bearing adapter of claim 2, wherein the bearing unit has an axial extent that is greater than an axial extent of the bearing recess of the accessory tool.

4. The bearing adapter of claim 1, wherein the bearing unit has a first collar-shaped portion and a second collar-shaped portion.

5. The bearing adapter of claim 4, wherein the bearing unit has at least one cylindrical portion.

6. The bearing adapter of claim 5, wherein in a connected state, the at least one cylindrical portion protrudes by a distance on a side of the accessory tool that faces away from the first collar-shaped portion when the bearing unit is mounted on the accessory tool.

7. The bearing adapter of claim 6, wherein the at least one cylindrical portion is integral with the first or the second collar-shaped portion.

8. The bearing adapter of claim 7, wherein the bearing unit is realized as a single part.

9. The bearing adapter of claim 1, wherein the bearing unit has a first bearing element and a second bearing element connectable to each other by at least one of a force-fit, a form-fit, and a material closure.

10. The bearing adapter of claim 9, wherein at least one of the first bearing element and the second bearing element is arranged in the bearing recess of the accessory tool such that a clearance fit is achieved when the other of the first bearing element and the second bearing element is not arranged in the bearing recess of the accessory tool.

11. The bearing adapter of claim 9, wherein the second bearing element is configured to be inserted in the first bearing element such that the second bearing element expands the first bearing element such that the first bearing element is connected to the accessory tool in a force-fitting manner when the bearing unit is mounted on the accessory tool.

12. The bearing adapter of claim 9, wherein the first bearing element includes a projection that projects radially inwards.

13. The bearing adapter of claim 1, wherein the bearing unit is in the shape of a circular ring.

14. The bearing adapter of claim 1, wherein the bearing unit is in the shape of a circular segment.

15. A system, comprising:
   an accessory tool having two sides and a bearing recess matched to a diameter of an output unit of a first power tool; and
   a bearing unit received on the accessory tool, the bearing unit configured to reduce the bearing recess of the accessory tool to a delimited bearing recess matched to a diameter of an output unit of a second power tool, and the bearing unit configured to adjoin the accessory tool and to enclose a portion of the accessory tool on the two sides, wherein
   the bearing unit has a first bearing element and a second bearing element that are connected to each other by at least one of a force-fit, a form-fit, and a material closure, and
   the second bearing element is configured to be inserted in the first bearing element such that the second bearing element expands the first bearing element such that the first bearing element is connected to the accessory tool in a force-fitting manner.

16. The system of claim 15, wherein the bearing unit has a radial extent that is greater than a radial extent of the bearing recess of the accessory tool.

17. The system of claim 16, wherein the bearing unit has an axial extent that is greater than an axial extent of the bearing recess of the accessory tool.

18. A bearing adapter for a disk-shaped accessory tool having two sides, comprising;
   a bearing unit configured to reduce a bearing recess of the accessory tool, the bearing unit configured to adjoin the accessory tool and to enclose a portion of the accessory tool on the two sides when the bearing unit is mounted on the accessory tool, wherein the bearing unit is in the shape of a circular segment.

* * * * *